(12) United States Patent
Kour et al.

(10) Patent No.: US 11,790,239 B2
(45) Date of Patent: Oct. 17, 2023

(54) DEEP LEARNING TESTING

(71) Applicant: International Business Machines Corporation, Armonk, NY (US)

(72) Inventors: George Kour, Tel Aviv (IL); Guy Hadash, Haifa (IL); Yftah Ziser, Haifa (IL); Ofer Lavi, Tel Aviv (IL); Guy Lev, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 1168 days.

(21) Appl. No.: 16/236,428

(22) Filed: Dec. 29, 2018

(65) Prior Publication Data

US 2020/0210848 A1  Jul. 2, 2020

(51) Int. Cl.

| | |
|---|---|
| *G06N 3/08* | (2023.01) |
| *G06N 3/088* | (2023.01) |
| *G05D 1/10* | (2006.01) |
| *G05D 1/02* | (2020.01) |
| *G05D 1/00* | (2006.01) |
| *G06F 18/21* | (2023.01) |

(52) U.S. Cl.
CPC ........... *G06N 3/088* (2013.01); *G05D 1/0088* (2013.01); *G05D 1/021* (2013.01); *G05D 1/101* (2013.01); *G06F 18/217* (2023.01)

(58) Field of Classification Search
CPC ...... G05D 1/0088; G05D 1/021; G05D 1/101; G06K 9/6262; G06K 9/6271; G06N 3/0454; G06N 3/0472; G06N 3/088; G06N 3/045; G06N 3/047; G06V 10/82; G06V 10/98; G06F 18/214; G06F 18/217

See application file for complete search history.

(56) References Cited

U.S. PATENT DOCUMENTS

| | | | |
|---|---|---|---|
| 9,547,821 B1 | 1/2017 | Loreggia et al. | |
| 9,721,561 B2 | 8/2017 | Tang et al. | |
| 10,402,726 B1 * | 9/2019 | Moore | G06F 3/04842 |
| 2007/0244842 A1 * | 10/2007 | Ishii | G06N 3/04 |
| | | | 706/18 |
| 2017/0024642 A1 | 1/2017 | Xiong et al. | |
| 2018/0198800 A1 * | 7/2018 | Krasser | G06N 20/00 |

(Continued)

FOREIGN PATENT DOCUMENTS

| | | | |
|---|---|---|---|
| CN | 105183646 A | 12/2015 | |
| WO | WO-2018213205 A1 * | 11/2018 | G06F 8/36 |

OTHER PUBLICATIONS

Yuchi Tian et al., DeepTest: Automated Testing of Deep-Neural-Network-driven Autonomous Cars, ICSE '18, May 27-Jun. 3, 2018, Gothenburg, Sweden, pp. 1-12.

(Continued)

*Primary Examiner* — Brent Johnston Hoover
(74) *Attorney, Agent, or Firm* — Daniel Morris; Otterstedt & Kammer PLLC

(57) ABSTRACT

A specification of a property required to be upheld by a computerized machine learning system is obtained. A training data set corresponding to the property and inputs and outputs of the system is built. The system is trained on the training data set. Activity of the system is monitored before, during, and after the training. Based on the monitoring, performance of the system is evaluated to determine whether the system, once trained on the training data set, upholds the property.

24 Claims, 7 Drawing Sheets

(56) References Cited

U.S. PATENT DOCUMENTS

2019/0019423 A1* 1/2019 Choi .................... G05D 1/0088
2019/0042894 A1* 2/2019 Anderson ............ G06K 9/6293
2020/0097847 A1* 3/2020 Convertino .............. G06N 3/08

OTHER PUBLICATIONS

Open Source Project on website GitHub entitled "Testing framework to simplify writing ML unit tests", Webpage—https://github.com/Thenerdstation/mltest, 9 pages, downloaded Dec. 8, 2018.

Kexin Pei et al., DeepXplore: Automated Whitebox Testing of Deep Learning Systems, Proceedings of the 26th Symposium on Operating Systems Principles. ACM, 2017, 18 pages.

Peter Mell and Timothy Grance, The NIST Definition of Cloud Computing, NIST Special Publication 800-145, Sep. 2011, cover, pp. i-iii, pp. 1-3.

Wikipedia, Artificial neural network, pp. 1-45 downloaded Dec. 8, 2018 from https://en.wikipedia.org/wiki/Artificial_neural_network.

Anonymous, Autoencoders: Variational Autoencoders, pp. 1-2, downloaded Dec. 8, 2018, from https://www.doc.ic.ac.uk/~js4416/163/website/autoencoders/variational.html.

* cited by examiner

DEEP LEARNING TESTING

BACKGROUND

The present invention relates to the electrical, electronic, and computer arts, and more specifically, to artificial intelligence (AI), machine learning, and machine reasoning.

Recently, deep learning (DL) has made significant progress in achieving or even surpassing human-level performance for a diverse set of tasks. This has resulted in a high level of adoption of DL-based systems in applications such as self-driving cars, malware detection, and aircraft collision avoidance systems. The quality of such safety-critical systems is important; as are the predictability and correctness of such systems.

Conventional software testing is a straightforward activity, in which, for every input, there should be a defined and known output. The known output can be used to test the correctness of the system. However, in neural systems, the output is not well-defined and possibly ambiguous, and it is more difficult to determine whether a particular result is a bug.

SUMMARY

Principles of the invention provide techniques for deep learning testing. In one aspect, an exemplary method includes the step of obtaining a specification of a property required to be upheld by a computerized machine learning system; building a training data set corresponding to the property and inputs and outputs of the system; training the system on the training data set; monitoring activity of the system before, during, and after the training; and, based on the monitoring, evaluating performance of the system to determine whether the system, once trained on the training data set, upholds the property.

In another aspect, an exemplary apparatus includes a computerized user interface; a computerized data generator; a computerized training component; a computerized profiler; and a computerized verifier. The user interface obtains a specification of a property required to be upheld by a computerized machine learning system. The data generator builds a training data set corresponding to the property and inputs and outputs of the system. The training component trains the system on the training data set. The profiler monitors activity of the system before, during, and after the training. The verifier, based on the monitoring, evaluates performance of the system to determine whether the system, once trained on the training data set, upholds the property.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

ability to rapidly test the logical correctness of neural components;

improves the performance of a computer testing a neural component by reducing the amount of CPU time required for testing;

ensures, with high confidence, that a neural component will behave as expected;

allows faster development and deployment of neural network components by different technical teams.

These and other features and advantages of the present invention will become apparent from the following detailed description of illustrative embodiments thereof, which is to be read in connection with the accompanying drawings.

DETAILED DESCRIPTION

Figure 1:
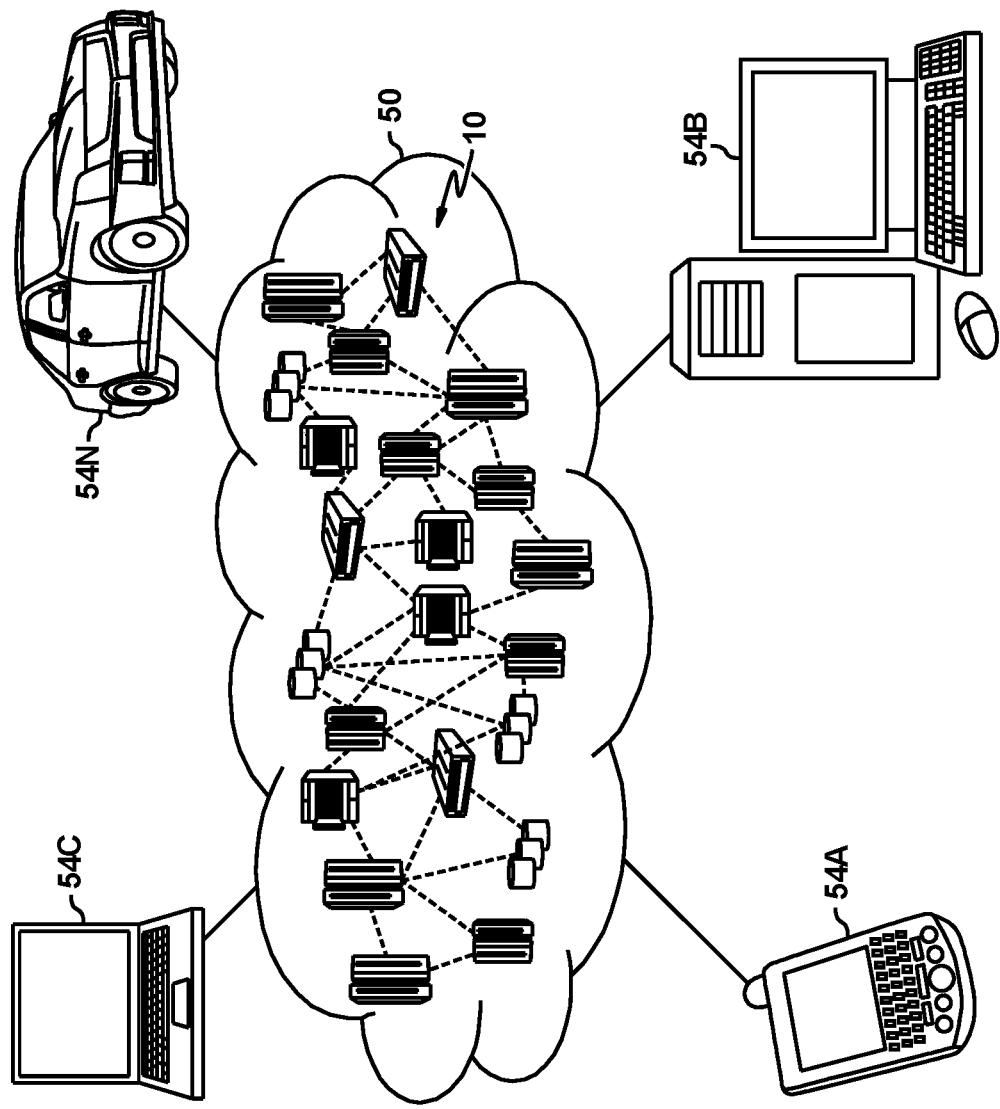
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
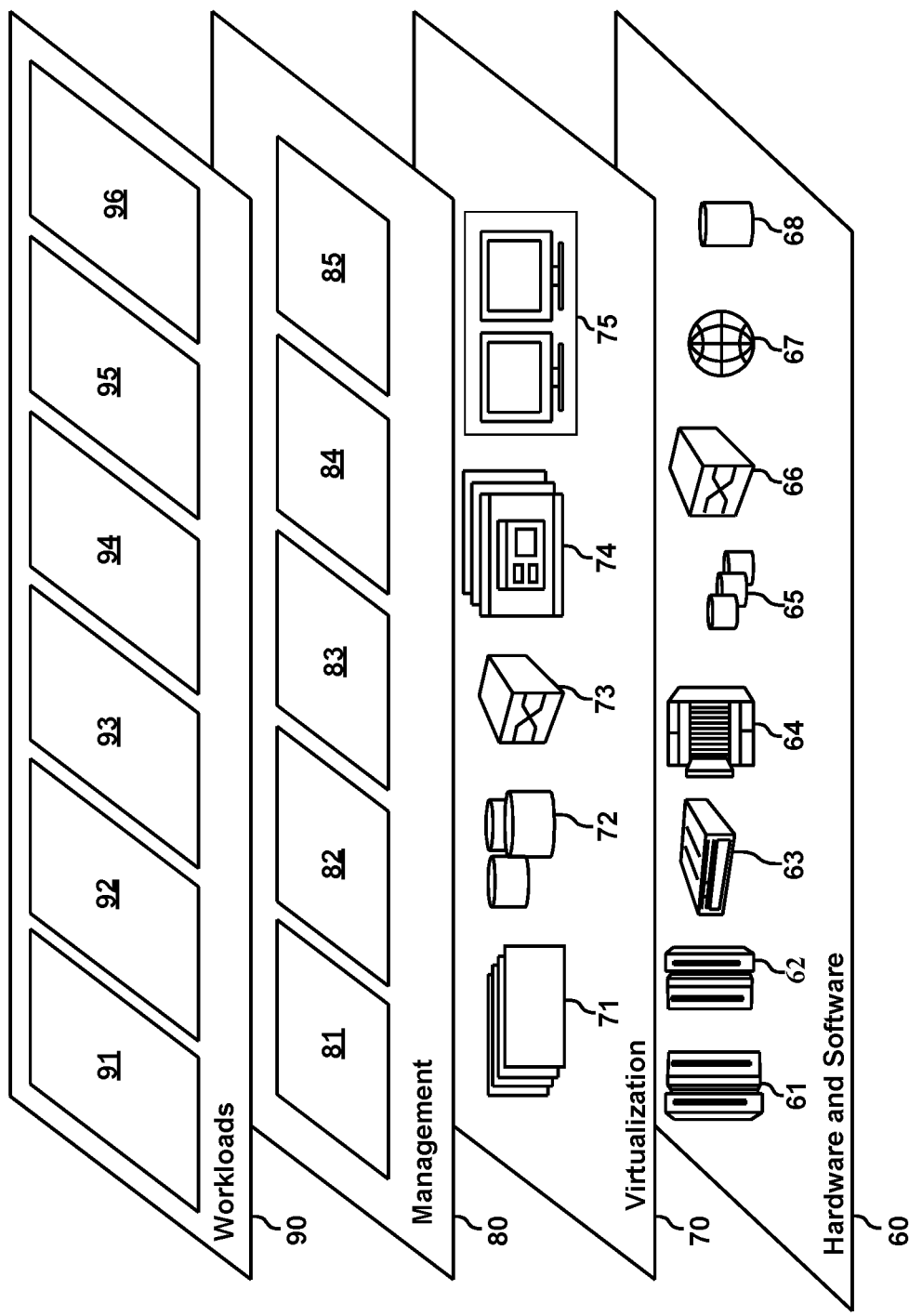
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a service 96 for deep learning testing, according to an aspect of the invention.

Currently, Deep Neural Networks (DNNs) usually perform one specific task "end-to-end." They rarely collaborate to perform complex tasks and are usually developed by a small team of highly skilled researchers. However, in the near future, large scale neural systems containing hundreds of neural components that collaborate together, and that are developed by several teams of software programmers, will be omnipresent. The widespread usage and distributed development of such neural components will require maintaining a high level of quality during and after development; all the more so, if such components are to be integrated in mission-critical systems. Furthermore, the need for agile development in the software industry will require a technique for rapid assessment of changes made in these learning components. However, with current techniques, machine learning models are generally difficult to evaluate, and DNNs consume huge computational and time resources during training.

One or more embodiments advantageously provide techniques that allow fast validation of machine learning models, especially addressing neural-based model components, using an approach wherein software designers define formal, precise and verifiable interface specifications for software components.

In a nutshell, machine learning (ML) models in general, and DNNs in particular, are challenging to evaluate and take a lot of time and computational resources to train. In one or more embodiments, property-based testing addresses these two problems, by allowing fast validation of some basic and/or core properties of the model. Hence, it is possible to verify that the model will perform well even on samples that have low representation in the validation and testing sets, while also allowing quick assessment of changes in the model. In one or more embodiments, the properties are validated by creating a small data-set (that corresponds to the property) and an evaluation criterion. In the prior art, datasets are not used to test a specific aspect (property) of the model (as in one or more embodiments), but are used as a validation or a testing set to assess the overall accuracy of the model (thus, data-sets are smaller than the prior art in one or more embodiments because it is only necessary to test against the property rather than the overall model). Furthermore, in the prior art, datasets are not created (de novo) to test the model performance or used to evaluate specific aspect(s) of the model. Yet further, in the prior art, the evaluation criterion is mainly the model accuracy; recall and precision in the discriminative model. In a generative model, the evaluation criterion is more task specific. Unlike prior art approaches, in one or more embodiments, the specific properties are tested against. Compared to the common model evaluation by training/validation/test partitioning of the data-set, this is a more explicit and proactive approach for testing ML models.

The maturity and widespread use of DNNs makes evaluating their performance important. As noted above, recently, deep learning (DL) has made significant progress in achieving or even surpassing human-level performance for a diverse set of tasks. This has resulted in a high level of adoption of DL-based systems in applications such as self-driving cars, malware detection, and aircraft collision avoidance systems. The quality of such safety-critical systems is important; as are the predictability and correctness of such systems.

Machine learning testing is not equivalent to deterministic programs testing. Software programs are usually a deterministic implementation of algorithms or functionalities in the sense that the programmer can easily define the relation between the input and output. Thus, testing in such cases is a straightforward activity in which for every input there is a well-defined and known output. The known output can be used to test the correctness of the system. Edge cases can be determined and addressed by the programmer reasonably easily and tests are written to make sure that the main flow and edge cases are handled properly. However, in statistical-based approaches, such as ML, the functionality of the program is determined by several factors, such as the model type and architecture, the number of parameters, the training data, the parameter initialization, the optimization technique, etc. Therefore, such systems may demonstrate unexpected or incorrect behaviors in some cases for several reasons, e.g., biased training data, over-fitting, and under-fitting of the models, making it more difficult to determine how they will behave under different circumstances and for different inputs.

Development of DNNs has been slow due to a lengthy feedback loop. Unlike deterministic computing, in which the feedback loop is short and changes can be assessed immediately after compilation, ML-based systems need to be trained on large data-sets to produce the required relationship between the input and the output. Specifically, in DNNs, the training is usually done by using some optimization technique, such as gradient descent, until some stopping criterion is met. However, since such systems may take days or even weeks to train, evaluating a change introduced in the architecture requires lengthy re-training. A common approach to assess the performance of such statistical components is to partition the data-set into training, validation, and testing subsets; use the training set to train the model and infer its parameters; use the validation set to tune the hyper-parameters; and use the test set to evaluate the model performance on an unseen data-set. Typically, more advanced evaluation methods are used such as cross-validation. However, the process of selecting the right model or architecture, tuning the hyper-parameters, and evaluating the model requires many iterations of model training, which may require a huge amount of time and computing resources. Furthermore, making a mistake in one of the model aspects results in a large amount of wasted time, effort, and money. This slows down the development process. One or more embodiments advantageously provide a new approach to allow fast evaluation of such systems.

We have found that evaluating the model on the test set is not enough. In addition, while these current approaches are reliable to determine the model performance on the validation and testing data distributions, they do not guarantee the model's performance on every possible input or assure that the model will behave in a specific way on input of a specific type. One or more embodiments advantageously provide a more proactive method for testing these statistical models, by making sure, with high confidence, that the system will behave as expected (or at least will not return egregious results).

We believe that in the future, unskilled programmers will build neural networks. In addition, in the near future, many software systems will be developed based on neural networks. This will result in software programmers unskilled in the field of neural networks being given the responsibility of building high-scale neural systems containing hundreds or thousands of neural components and layers spread on thousands of lines of code. Similar to deterministic software systems, the complexity of Neural systems will require testing on several levels, such as unit, integration and system tests. Each of these validates the system in a different resolution.

We believe that the size and complexity of future neural networks, as well as their distributed development, will require due care in testing to ensure that they work properly, particularly due to the size and complexity of such systems when developed by different teams possessing different skill sets. This will make the integration of the different building blocks more challenging and require clearer interfaces. In order to maintain high quality of the system parts, acceptance tests should be executed for verifying the neural component interface and functionality.

We believe that the revolution of automated testing will come to the statistical computing domain. Similar to the transition seen in the field of (deterministic) software development, in which testing tools become an integral part of the development process, we anticipate this transition to be seen in the development process of neural systems. This will be a pertinent aspect to maintain a feasible level of control over these complex systems and keep the technical debt at manageable levels.

Advantageously, one or more embodiments provide a testing approach that enables neural system developers to rapidly test the logical correctness of neural components. In order to be able to rapidly test the model properties, the developer cannot feasibly wait days or weeks after each change she or he makes in the model. Advantageously, one or more embodiments train the model on a small dataset that is specifically designed to check that the model upholds a required property. The system is property based; namely, given a property, the framework automatically validates that the property holds under the network architecture.

To assess the network adherence to the property, the framework may do one or more of the following steps: (i) build a training dataset and possibly a testing dataset that corresponds to the property and the network Input/Output (I/O); (ii) monitor the activity of the network before, after, and during training; (iii) evaluate the network performance (and possibly the network's output on the test set).

The system design allows extensibility and reusability, in the sense that once a property is designed, and the corresponding generation procedure, and profiling and validation procedures, are specified, the procedures that generate the relevant data, profiles and assess the model against the property can be published in a repository and re-used to validate many different components and models. In one or more embodiments, the user selects from the repository only those properties that the network he or she is testing is required to uphold. If such a property does not already exist, however, she or he implements it.

Figure 3:
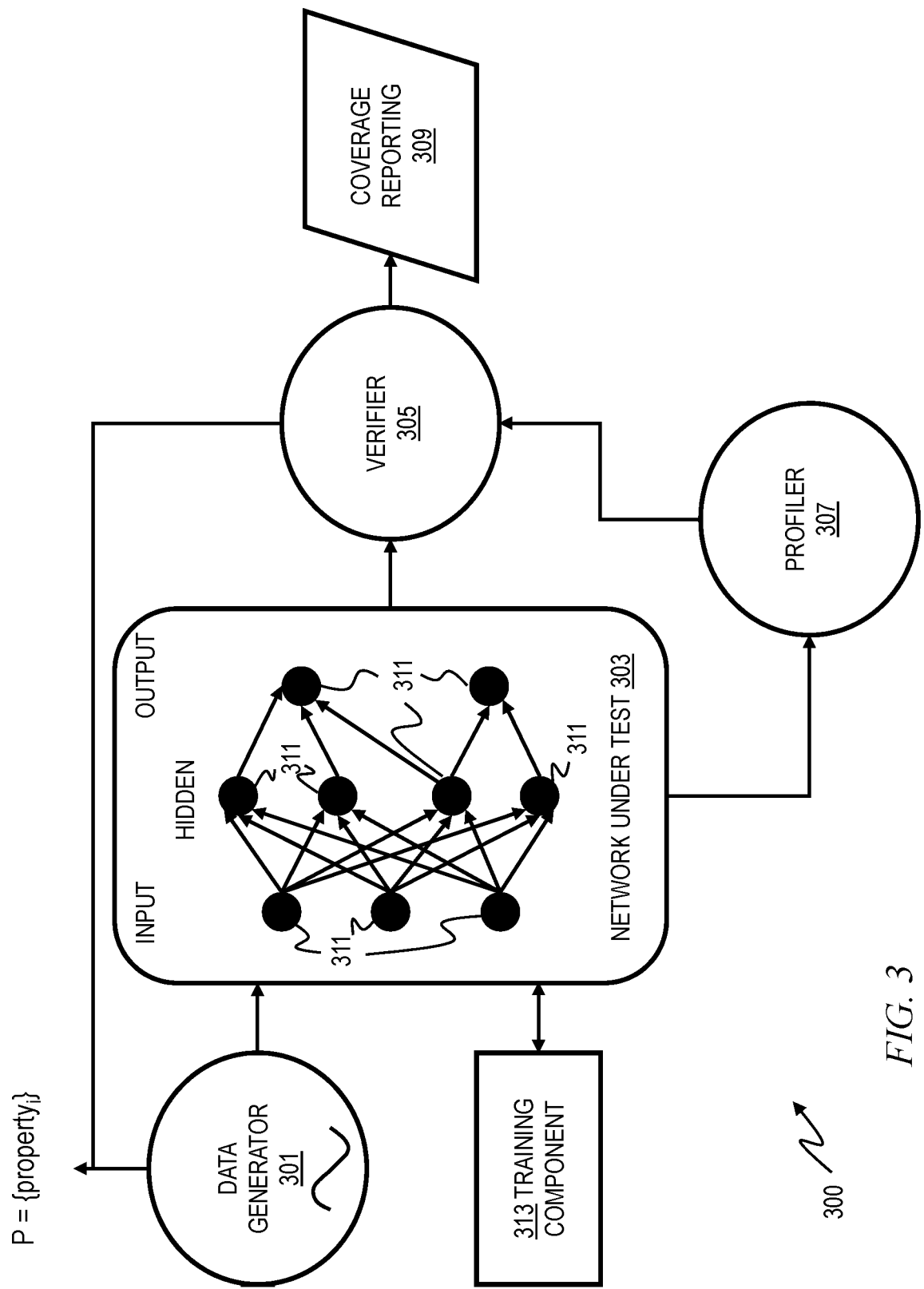
FIG. 3 is a block diagram of an exemplary system, according to an aspect of the invention.

Referring to FIG. 3, an exemplary embodiment of a testing system 300 includes three components. The data generator 301 generates data with respect to the properties. The profiler 307 inspects the network activity of the network under test (NUT) 303 and collects statistical indicators on the activity of the neurons 311 to allow profiling of such activity during training and inference. The verifier 305 tests and reports the adherence of the network activity and output to the desired properties (coverage reporting 309).

Given a dataset D=(x,y), training a discriminative neural network model M involves finding the model parameter (weights) $\theta$ that minimizes a loss function that captures the expected discrepancy between $\hat{y}=M(x;\theta)$, i.e. the model prediction and the true label y, over (x,y) sampled from the same distribution as D. The parameter $\hat{y}$ is defined to mean the prediction the model makes on the data sample x.

While the commonly used techniques for evaluating a model evaluate the trained model on a test set, one or more embodiments aim at validating the properties of the model: what can it capture; what is its learning capacity; what characterizes it; and so on.

Note that the dataset can be derived from the user data or created synthetically and that the property dataset may be partitioned into training and testing subsets. In one or more embodiments, the profiling methods (which determine what elements of the network should be collected and reported during the training), are specified. Furthermore, in one or more embodiments, the validation procedure (i.e. what metrics should be calculated and what the KPIs (key performance indicators) for passing the property test are) should be defined. The metrics may be defined using the property testing data-set or by other suitable techniques such as monitoring the loss during training.

Below is a non-limiting exemplary list of properties that the testing framework can semi-automatically verify the model against. The properties are of different types. Some properties can be evaluated on the model directly, regardless of the model parameters, and other properties are verified by training the model on a given dataset first and then verifying thereafter.

Value assertions—for instance, the output of the network should sum to one or should be smaller than a given threshold.

Over-fitting—the network should be able to over-fit when trained on a small portion of the data (small dataset from the original task dataset).

Train-ability—trained on a small set of data, the confidence of the network should be larger than a given threshold on every sample in the training set.

Noise resiliency—Given a small set of training data and the same training data with random noise, the trained model parameters should perform similarly on the test data.

Stability—the performance of the network trained on a given size training set does not change drastically with different random parameter initialization.

Invariability under affine transformation (a linear mapping method that preserves points, straight lines, and planes): e.g., translation, rotation, resizing, etc.

Invariability under non-linear transformation: Image/sound filters; Impulse response; Gaussian noise; etc. In this regard, consider an example. Suppose the model aims at identifying human faces in images (namely say "yes" if there is a face and "no" otherwise). If an image is shifted by a specific number of pixels, the model should return the same answer. If some noise added to the image, such as black pixels, or a filter (i.e. accessories/special effects used to transform users' faces on social media applications) is added to the image, the model should still be able to identify faces if they exist.

Invariability under augmentation: e.g., if the face is augmented with eyeglasses, the face will be still detected.

Sanity: the network should be able to over-fit on linearly separable data (a de novo dataset which is created linearly separable; namely it can be classified easily by a linear classifier).

Stability—a small change in the input should result in a small change in the output.

Sequentiality—feeding the model with different permutations of the same input and assigning a different label for each permutation should give a very strong signal about the model ability to capture the input order.

Order invariant—if the model is designed so that order does not matter to some extent, the data can be permuted while remaining with the same labels. If the component can learn with the permutation, it is also a strong signal for order invariance.

Fool proof—while deep neural networks can perform a wide variety of tasks with remarkable accuracy, it has been shown that under certain circumstances, deep neural networks can be fooled by applying small changes to the sample, which was originally classified correctly by the network. Thus, to test the sensitivity of the network to such changes, a Generative Adversarial Network (GAN) 557 (discussed below) that generates high quality synthetic data can be employed, so that the network performance can be tested on such generated data.

Figure 4:
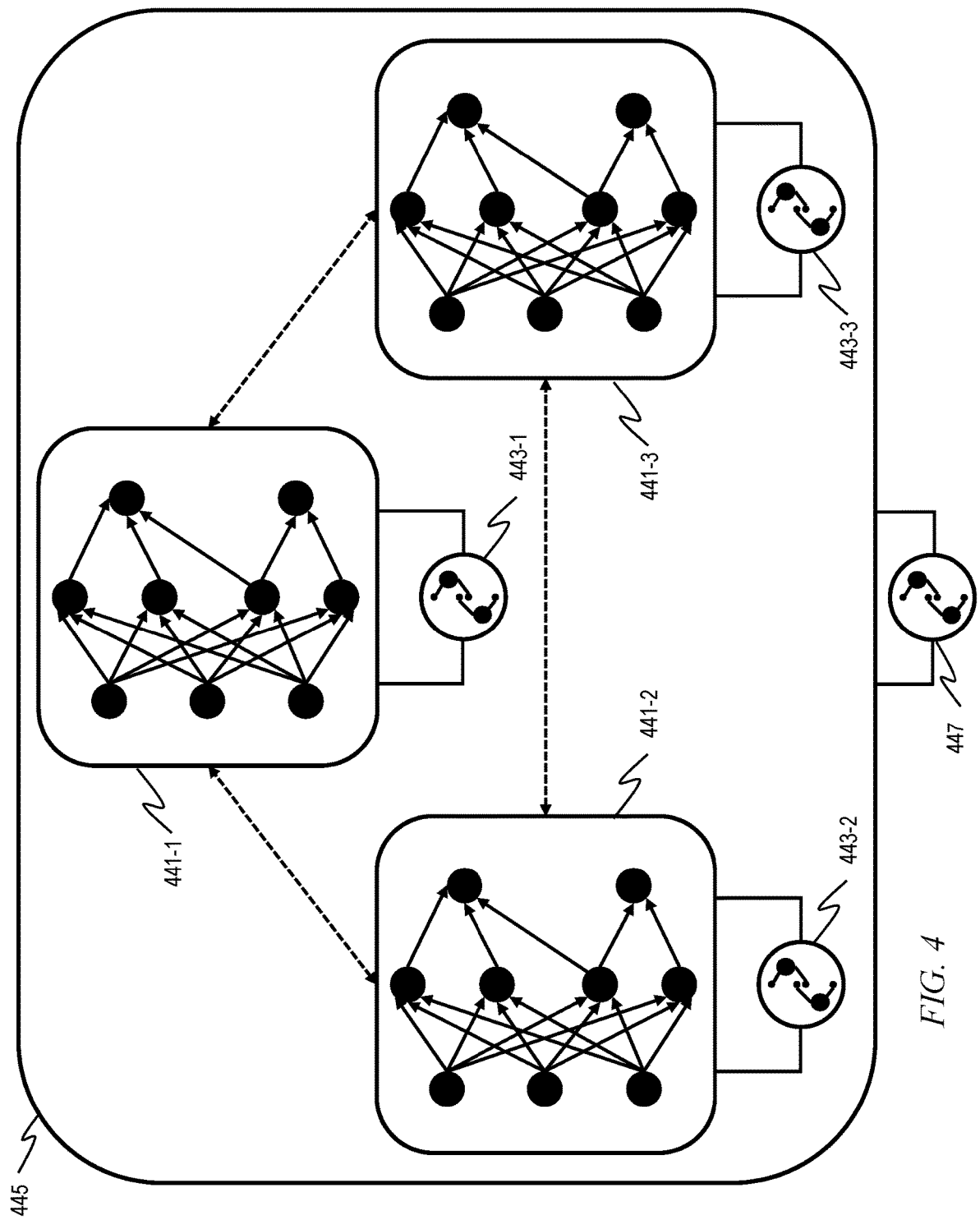
FIG. 4 depicts an exemplary framework, according to an aspect of the invention.

The framework can be used to validate the entire model, or any part of the network, as can be seen in FIG. 4. In particular, an instance 447 of the framework can be used to validate the entire network 445; or an instance 443-1, 443-2, 443-3 of the framework can be used to validate a corresponding portion 441-1, 441-2, 441-3 of the network. For example, if the system is composed of several models that interact together for some goal, the framework can be used to test each component independently, or can be used to test the system end-to-end.

The generator is a significant part of the architecture, in one or more embodiments, as its role is to generate the relevant dataset to assess the framework's desired properties. Depending on the property, it can operate differently to create the training/testing data-set. Some non-limiting examples of operation modes are the following:

Synthetically create the training (and testing) data according to the network input and output.

Use a subset of the original training data, optionally manipulating it,

Use Generative adversarial networks or variational auto encoders to create synthetic data taken from the same distribution as the original task data.

Figure 5:
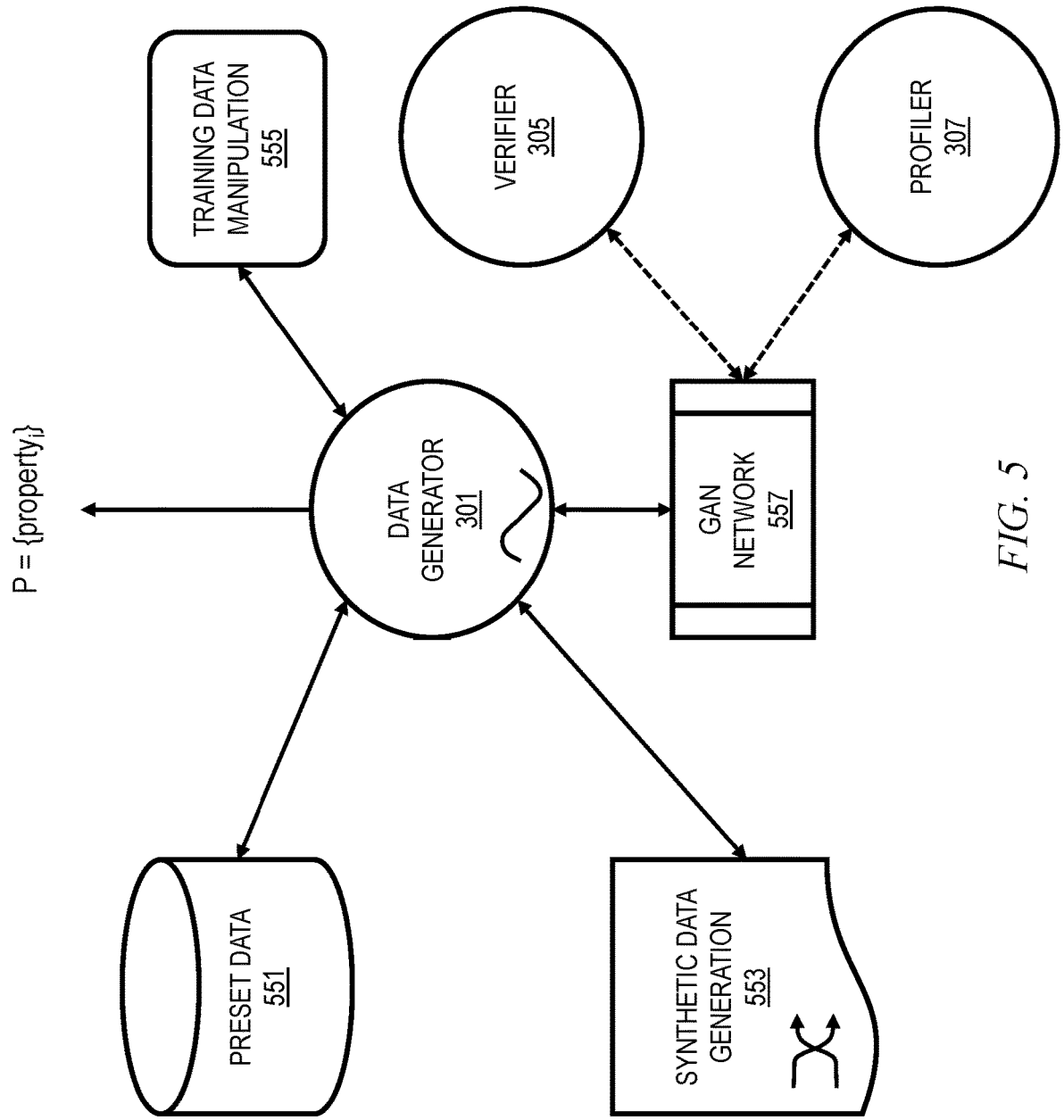
FIG. 5 shows exemplary details of a data generator of FIG. 3, according to an aspect of the invention.

A schematic description of the generator 301 is depicted in FIG. 5. In one or more embodiments it interacts with the verifier 305 and profiler 307 via generative adversarial network (GAN) network 557. An adversarial network may obtain as input the output of the profiler and verifier, to create more "challenging" examples and check the model accuracy. As noted, the dataset can be derived from the user data (preset data 551) or created synthetically as shown at 553. The optional training data manipulation is shown at 555.

How to Validate Induced Properties

During the model development, the framework user can explicitly select, from the list above, the suite of properties that he or she is interested in testing the model against; thus, these properties are referred to herein as "Explicit Properties." However, in many cases, it is difficult to explicitly define the properties the model should have; therefore, one or more embodiments advantageously provide a technique for capturing different properties of the data that the user can select from.

Figure 6:
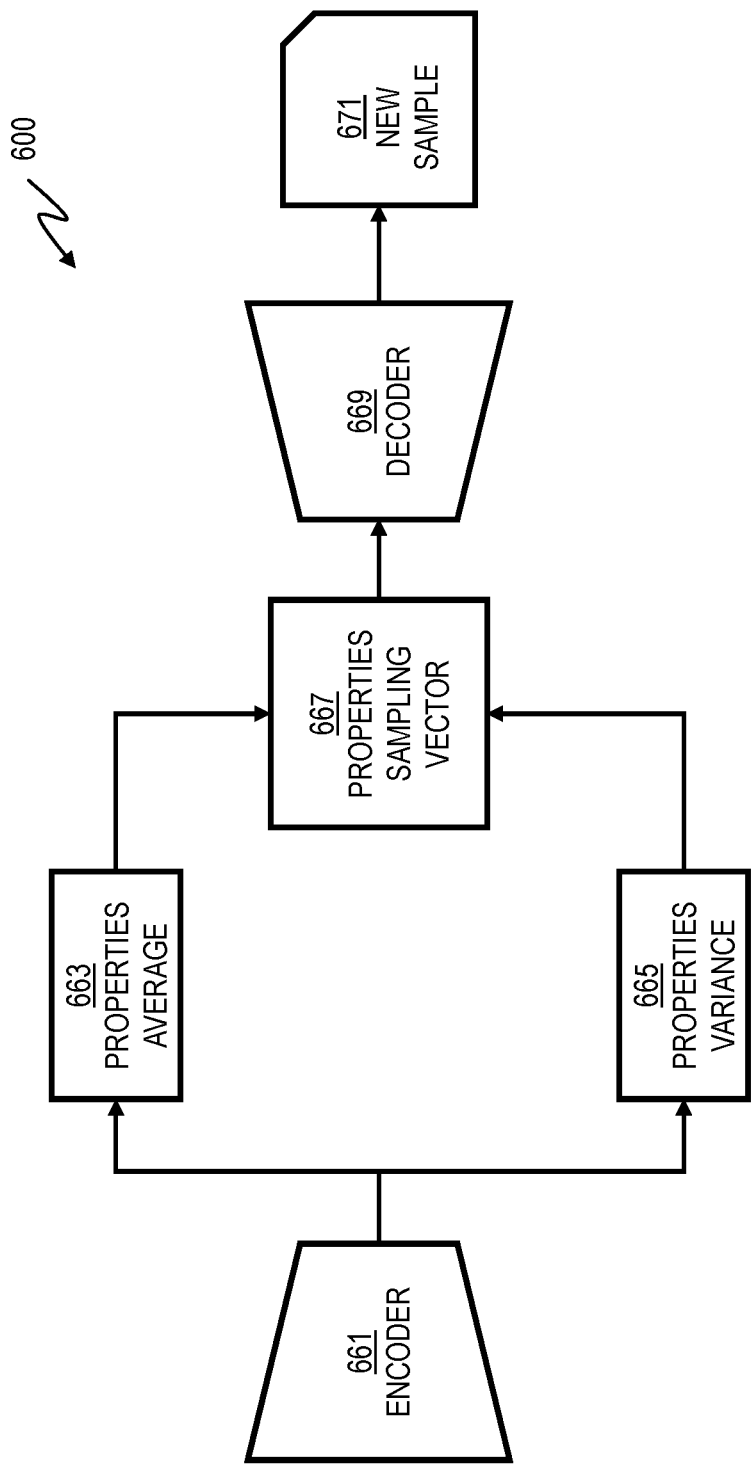
FIG. 6 shows validation of induced properties, according to an aspect of the invention.

Furthermore in this regard, one or more embodiments use an unsupervised model to be able to learn a representation that captures the different underlying aspects of the samples X, and which is able to generate examples for a given feature vector. A variational autoencoder (VAE) 600 in FIG. 6 is appropriate for this task in one or more embodiments. The variational autoencoder 600 includes encoder 661 which generates a vector of means (properties average 663) and a vector of standard deviations (properties variance 665).

For a given data set D={(x,y)}, the training framework trains a VAE on the samples (X).

After training, the model will learn a latent representation vector 667, in which each dimension represents a character of the data and every dimension of the vector is distributed from a normalized Gaussian distribution. The decoder 669 of the VAE can be used to create samples 671 by sampling from the latent vector. The user can visually examine the different properties and determine what properties she or he is interested in testing the framework against. The VAE can generate an unlimited number of samples, and thus, the property training and validation sets can be created effortlessly.

Since the training of the VAE is independent of the NUT, the VAE can be trained once and used during the development of the NUT.

Properties as just described are referred to herein as "Induced Properties."

Verifying Non-Degrading Computational Capacity

In addition, the system can check that the computational ability of a sub-component does not degrade due to a change, given that the system was trained end-to-end.

For a given sub-component in the entire network, in the last epoch of training, the system may record the input and the corresponding output for each sample. Denote the input-output of the component after training on the training set as (X',Y'). After introducing the change, the component will be validated by trying to over-fit on (X',Y'). If the component fits onto this training data, it can be concluded that the computational power did not degrade. On the other hand, if the component does not fit onto this training data, it can be concluded that the computational power did indeed degrade.

Examination Against the Trained Model

Note that most of the properties mentioned above can be also examined against the trained model. However, in this case, the training part of the property test should not be executed, and the model should be examined only against the validation part of the property dataset. These tests can function as "sanity tests" before deploying the trained model in production.

IQ Test for Reinforcement Learning (RL) Agent Models

In reinforcement learning, instead of generating samples, the framework can provide a simplified simulation of the real environment, to test the fit of the new implementation, to achieve good decision making abilities in the simplified environment.

Creating a Model

Training a large network takes a lot of time, resources, and samples. However, since neural networks usually use the same basic components and layers, given a specification of the network, the framework may be able to create a minimized model of the (large) network by keeping the same components and connectivity, but using a smaller number of neurons, and checking the validity of this model by creating data suitable for the size of the model.

One or more embodiments advantageously provide an easy-to-use and extensible framework for quick validation of Neural network models, based on examination of explicit and induced properties. A set of useful and commonly needed properties are disclosed herein. In one or more embodiments, implicit properties can be extracted from the training data in an unsupervised manner using a variational autoencoder, which can be used to test the model against. A technique is disclosed for verifying non-degrading computational capacity of a neural component using latent representation from a well-trained model.

Given the discussion thus far, it will be appreciated that, in general terms, an exemplary method, according to an aspect of the invention, includes the step of obtaining a specification of a property required to be upheld by a computerized machine learning system; e.g., computerized deep-learning-based network 303. One or more embodiments are applicable to a variety of systems; e.g., deep neural networks (DNN); decision trees; support vector machines; and the like. This step can be carried out, for example, with a suitable user interface of a computer implementing the network. A further step includes building a training data set corresponding to the property and inputs and outputs of the network. This step can be carried out, for example, with data generator 301. Data can refer, in general, to the task data and the data used to check the property. To test a specific aspect of the model, one or more embodiments use specific data (generated de novo or taken from the task dataset). As noted above, data-sets in one or more embodiments are smaller than the prior art because it is only necessary to test against the property rather than the overall model). In one or more embodiments, the steps are carried out without testing against the overall model, thereby reducing CPU time.

A still further step includes training the network on the training data set. This step can be carried out, for example, using a suitable training component 313 (a gradient descent trainer is a non-limiting example which works well on DNN and the like). Yet a further step includes monitoring activity of the network before, during, and after the training. This step can be carried out, for example, using profiler 307. An even further step includes, based on the monitoring, evaluating performance of the network to determine whether the network, once trained on the training data set, upholds the property. This step can be carried out, for example, using verifier 305. Consider how information collected by the profiler can be used by the verifier (evaluator). For instance, the profiler can check the activity of the neurons, and report "dead neurons," that always output zero. Note that in one or more embodiments, the verifier does have to get information from the profiler to make a decision about the fit of the model with respect to the property.

Some embodiments further include building a test data set corresponding to the property and inputs and outputs of the network; and testing the network, once trained on the training data set, with the test data set, to further verify whether the network, once trained on the training data set, upholds the property. The test data set can be built, for example, by creating a property data set corresponding to the property and the inputs and outputs of the network; then, building of the training data set and the test data set includes partitioning the property data set into the training data set and the test data set (e.g., using data generator 301). The network can be tested by running it and analyzing it with the profiler and verifier.

The training data set can be built by deriving the training data set from user data, as at 551, or by creating the training data synthetically, as at 553.

Figure 7:
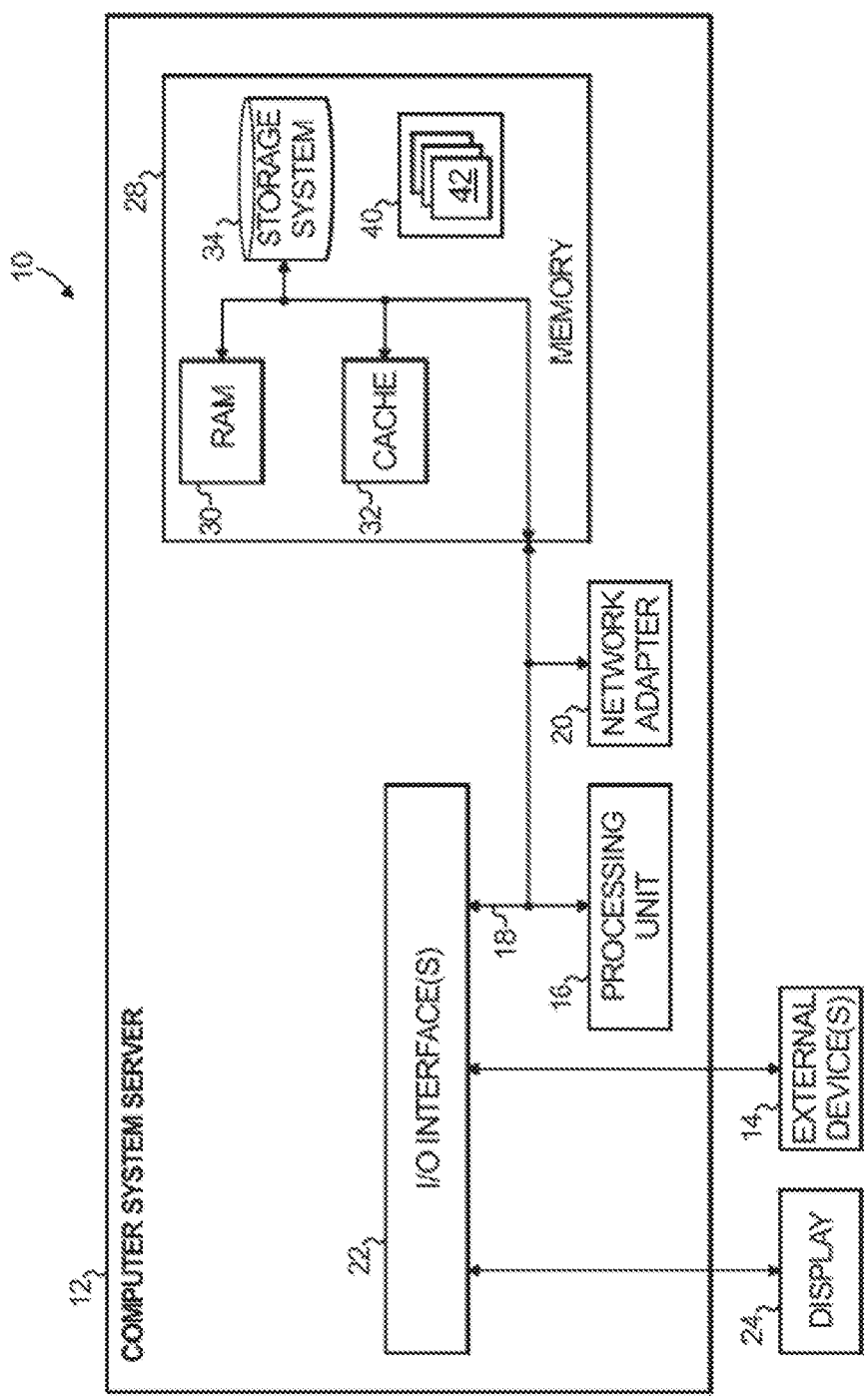
FIG. 7 depicts a computer system that may be useful in implementing one or more aspects and/or elements of the invention, also representative of a cloud computing node according to an embodiment of the present invention.

In one or more embodiments, once the evaluating indicates that the network does indeed uphold the property (and optionally, any other pertinent properties), the network is deployed for use. One or more embodiments further include controlling at least one physical system by the deployed network. For example, the deploying can include deploying in a self-driving vehicle, and a further step then includes controlling the self-driving vehicle by the deployed network. In another aspect, the deploying includes deploying in a computer network for malware detection, and a further step then includes detecting malware by the deployed network and mitigating the malware. In still another aspect, the deploying includes deploying in an aircraft collision avoidance system, and a further step then includes controlling an aircraft at least in part by the deployed network to avoid a collision during flight of the aircraft. Referring to FIG. 7, discussed in greater detail below, in the case of a self-driving vehicle or aircraft, an on-board computer may omit unnecessary components such as display 24; network adapter 20, I/O interfaces 22, or other connectivity (e.g. bus 18) is provided to the vehicle controls or aircraft controls. In the case of malware detection and mitigation, non-limiting examples of remedial actions include blocking network traffic from an identified host having malware thereon (for example, using a firewall). In some instances, this can be done in response to first monitoring network traffic from the identified host, and then blocking the traffic when an anomaly is verified. In another aspect, a remedial action includes scanning the identified host for malware and removing or quarantining discovered malware thereon. Observations can be made and/or remedial actions can be initiated, for example, via the network adapter 20, I/O interfaces 22, or the like.

In one or more embodiments, a further step includes publishing the property to a repository for re-use. Once someone has implemented the methods related a property; namely, the corresponding data generator method, the corresponding profiler (optional) and verifier, it can be used by others on different networks (that were built for other tasks).

The specification of the property can be obtained, for example, as an explicit specification from a user selection from a list of properties.

On the other hand, in some instances, obtaining of the specification of the property includes training a variational autoencoder (VAE) 600 on a plurality of samples; learning a latent representation vector 667, based on the training; sampling from the latent representation vector to generate a plurality of candidate properties; and obtaining a specification from a user selection from a list of the plurality of candidate properties. Furthermore regarding training the VAE, in one or more embodiments, the VAE is trained on the task dataset and then it generates new data samples. The goal of the VAE is to generate one or more new datasets, that is/are similar (in a specific aspect) but not the same as the data it is trained on. For example, train the VAE on a dataset of handwritten digits images and the goal is to create a new image of handwritten digit "5" (artificially created by the VAE) which did not exist in the dataset.

In one or more embodiments, in the step of obtaining the specification of the property, the property is selected from: at least one value assertion; ability to overfit; trainability;

noise resiliency; stability; invariability under affine transformation; invariability under non-linear transformation; invariability under augmentation; stability; sequentiality; order invariance; and resistance to adversarial examples.

In another aspect, an exemplary apparatus includes a computerized user interface; a computerized data generator 301; a computerized training component 313; a computerized profiler 307; and a computerized verifier 305. The user interface obtains a specification of a property required to be upheld by a computerized machine learning system. The data generator builds a training data set corresponding to the property and inputs and outputs of the system. The training component trains the system on the training data set. the profiler monitors activity of the system before, during, and after the training. The verifier, based on the monitoring, evaluates performance of the system to determine whether the system, once trained on the training data set, upholds the property.

In a non-limiting example, the machine learning system includes a computerized deep-learning-based network.

In one or more embodiments, the data generator builds a test data set corresponding to the property and inputs and outputs of the network; and the verifier tests the network, once trained on the training data set, with the test data set, to further verify whether the network, once trained on the training data set, upholds the property.

In one or more embodiments, the data generator creates a property data set corresponding to the property and the inputs and outputs of the network, and the building of the training data set and the building of the test data set include the data generator partitioning the property data set into the training data set and the test data set.

The user interface can be implemented, for example, as HTML served out to a browser of a client machine. The data generator 301 can be implemented, for example, as described with regard to FIG. 5 and accompanying text. The training component 313 can be implemented, for example, as a gradient descent trainer.

The profiler 307 tracks the activity of the different components in the NUT during training and evaluation. The profiler 307 may collect a different kind of information but most pertinent in one or more embodiments is to track changes in the model parameters (weights) and the output of each component. Profiler 307 can also collect statistics on all or part of the neurons in the NUT. It may collect performance metrics such as time and memory consumption of each component. Here, a component can refer to a single neuron, a layer in a fully connected architecture, weights of the filters is a Convolutional layer, a recurrent component, or any composition of the those. If the model is not based on neural networks, it may collect equivalent information that is relevant to the model.

The verifier 305 is a method defined by the property author having the role to check to what extent the NUT is aligned with the property; namely, meets the requirement set by the property. The verifier may control the input and examine the corresponding output of the NUT. In addition, it may be provided with information from the profiler about what is going on inside the network during its training and evaluation. The verifier decides, based on this information, if the network has passed the verification, and/or to what extent the network is aligned with the property. If, for instance, the property is testing "overfitting," after the network is trained on a small dataset and the profiler has collected information about the activity in the network, the verifier will input one or more samples from the same dataset it was trained on and see if the output is correct; namely is it aligned with the corresponding label of the data. Note that in one or more embodiments, the verification method corresponds to a specific property and may use or ignore the information from the profiler, and is developed by the property author.

The software components can correspond to modules 42 in some embodiments.

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a service 96 for deep learning testing, according to an aspect of the invention.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described with regard to FIGS. 3, 5, and 6. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining a specification of a model property that is required to be upheld by a computerized machine learning system;
    obtaining a specification of a data property generated from a sampling from a latent representation learned based on a training of a variational autoencoder for which said model property is required to be upheld, wherein said obtaining of said specification of said data property comprises:
        training said variational autoencoder on a plurality of samples;
        learning said latent representation vector, based on said training;
        sampling from said latent representation vector to generate a plurality of candidate properties; and
        obtaining said specification of said data property generated from said sampling from said latent representation learned based on said training of said variational autoencoder from a user selection from a list of said plurality of candidate properties;
    building a training data set corresponding to said data property and inputs and outputs of said system;
    training said system on said training data set;
    monitoring activity of said system before, during, and after said training, wherein said monitoring activity includes at least one of detecting a dead neuron, tracking changes in weights of a filter in a convolutional layer of said system, or tracking time and memory consumption of one or more neurons in said system; and
    based on said monitoring, evaluating performance of said system to determine whether said system, once trained on said training data set, upholds said model property for data that exhibit the data property generated from said sampling from said latent representation learned based on said training of said variational autoencoder, wherein, in said step of obtaining said specification of said model property, said model property is selected from the group consisting of: at least one value assertion; ability to overfit on original and derived data; noise resiliency; stability; invariability under affine transformation; invariability under non-linear transformation; invariability under augmentation; stability; sequentiality; order invariance; and resistance to adversarial examples.

2. The method of claim 1, wherein said machine learning system comprises a computerized deep-learning-based network.

3. The method of claim 2, further comprising:
    building a test data set corresponding to said data property and inputs and outputs of said network; and
    testing said network, once trained on said training data set, with said test data set, to further verify whether said network, once trained on said training data set, upholds said model property.

4. The method of claim 3, further comprising creating a property data set corresponding to said data property and said inputs and outputs of said network, wherein said building of said training data set and said building of said test data set comprise partitioning said property data set into said training data set and said test data set.

5. The method of claim 2, wherein building said training data set comprises deriving said training data set from user data.

6. The method of claim 2, wherein building said training data set comprises creating said training data synthetically.

7. The method of claim 2, further comprising, responsive to said evaluating indicating that said network does indeed uphold said model property, deploying said network for use.

8. The method of claim 7, further comprising controlling at least one physical system by said deployed network.

9. The method of claim 8, wherein:
    said physical system comprises a self-driving vehicle;
    said deploying comprises deploying in said self-driving vehicle, and
    said controlling comprises controlling said self-driving vehicle by said deployed network.

10. The method of claim 8, wherein:
    said physical system comprises a computer network;
    said deploying comprises deploying in said computer network for malware detection; and
    said controlling comprises detecting malware by said deployed network and mitigating said malware.

11. The method of claim 8, wherein:
    said physical system comprises an aircraft collision avoidance system;
    said deploying comprises deploying in said aircraft collision avoidance system; and
    said controlling comprises controlling an aircraft at least in part by said deployed network to avoid a collision during flight of said aircraft.

12. The method of claim 2, further comprising, publishing said data property to a repository for re-use.

13. The method of claim 2, wherein said obtaining of said specification of said model property comprises obtaining an explicit specification from a user selection from a list of model properties.

14. The method of claim 2, wherein:
    said building of said training data set is carried out with a data generator executing on at least one hardware processor;
    said monitoring of said activity of said network is carried out with a profiler executing on said at least one hardware processor; and
    said evaluating of said performance of said network is carried out with a verifier executing on said at least one hardware processor.

15. A non-transitory computer readable medium comprising computer executable instructions which when executed by a computer cause the computer to perform a method of:

obtaining a specification of a model property that is required to be upheld by a computerized machine learning system;
obtaining a specification of a data property generated from a sampling from a latent representation learned based on a training of a variational autoencoder for which the model property is to be upheld, wherein said obtaining of said specification of said data property comprises:
training said variational autoencoder on a plurality of samples;
learning said latent representation vector, based on said training;
sampling from said latent representation vector to generate a plurality of candidate properties; and
obtaining said specification of said data property generated from said sampling from said latent representation learned based on said training of said variational autoencoder from a user selection from a list of said plurality of candidate properties;
building a training data set corresponding to said data property and inputs and outputs of said system;
training said system on said training data set;
monitoring activity of said system before, during, and after said training, wherein said monitoring activity includes at least one of detecting a dead neuron, tracking changes in weights of a filter in a convolutional layer of said system, or tracking time and memory consumption of one or more neurons in said system; and
based on said monitoring, evaluating performance of said system to determine whether said system, once trained on said training data set, upholds said model property for data that exhibit the data property generated from said sampling from said latent representation learned based on said training of said variational autoencoder, wherein, in said step of obtaining said specification of said model property, said model property is selected from the group consisting of: at least one value assertion; ability to overfit on original and derived data; noise resiliency; stability; invariability under affine transformation; invariability under non-linear transformation; invariability under augmentation; stability; sequentiality; order invariance; and resistance to adversarial examples.

16. The non-transitory computer readable medium of claim 15, wherein said machine learning system comprises a computerized deep-learning-based network.

17. An apparatus comprising:
a memory; and
at least one processor, coupled to said memory, and operative to:
obtain a specification of a model property required to be upheld by a computerized machine learning system;
obtain a specification of a data property generated from a sampling from a latent representation learned based on a training of a variational autoencoder for which the model property is to be upheld, wherein said obtaining of said specification of said data property comprises:
training said variational autoencoder on a plurality of samples;
learning said latent representation vector, based on said training;
sampling from said latent representation vector to generate a plurality of candidate properties; and
obtaining said specification of said data property generated from said sampling from said latent representation learned based on said training of said variational autoencoder from a user selection from a list of said plurality of candidate properties;
build a training data set corresponding to said data property and inputs and outputs of said system;
train said system on said training data set;
monitor activity of said system before, during, and after said training, wherein monitoring activity includes at least one of detecting a dead neuron, tracking changes in weights of a filter in a convolutional layer of said system, or tracking time and memory consumption of one or more neurons in said system; and
based on said monitoring, evaluate performance of said system to determine whether said system, once trained on said training data set, upholds said model property for data that exhibit the data property generated from said sampling from said latent representation learned based on said training of said variational autoencoder, wherein, in said step of obtaining said specification of said model property, said model property is selected from the group consisting of: at least one value assertion; ability to overfit on original and derived data; noise resiliency;
stability; invariability under affine transformation; invariability under non-linear transformation; invariability under augmentation; stability; sequentiality; order invariance; and resistance to adversarial examples.

18. The apparatus of claim 17, wherein said machine learning system comprises a computerized deep-learning-based network.

19. The apparatus of claim 18, further comprising a plurality of distinct software modules, each of the distinct software modules being embodied on a computer-readable storage medium, and wherein the distinct software modules comprise a data generator module, a profiler module, and a verifier module;
wherein:
said at least one processor is operative to build said training data set by executing said data generator module;
said at least one processor is operative to monitor said activity of said system by executing said profiler module; and
said at least one processor is operative to evaluate said performance of said network by executing said verifier module.

20. An apparatus comprising:
means for obtaining a specification of a model property required to be upheld by a computerized machine learning system;
means for obtaining a specification of a data property generated from a sampling from a latent representation learned based on a training of a variational autoencoder for which the model property is to be upheld, wherein said obtaining of said specification of said data property comprises:
training said variational autoencoder on a plurality of samples;
learning said latent representation vector, based on said training;
sampling from said latent representation vector to generate a plurality of candidate properties; and obtaining said specification of said data property generated from said sampling from said latent representation learned based on said training of said variational autoencoder from a user selection from a list of said plurality of candidate properties;

means for building a training data set corresponding to said data property and inputs and outputs of said system;

means for training said system on said training data set;

means for monitoring activity of said system before, during, and after said training, wherein said means for monitoring activity is configured to perform at least one of detecting a dead neuron, tracking changes in weights of a filter in a convolutional layer of said system, or tracking time and memory consumption of one or more neurons in said system; and means for, based on said monitoring, evaluating performance of said system to determine whether said system, once trained on said training data set, upholds said model property for data that exhibit the data property generated from said sampling from said latent representation learned based on said training of said variational autoencoder, wherein, in said step of obtaining said specification of said model property, said model property is selected from the group consisting of: at least one value assertion; ability to overfit on original and derived data; noise resiliency; stability; invariability under affine transformation; invariability under non-linear transformation; invariability under augmentation; stability; sequentiality; order invariance; and resistance to adversarial examples.

21. An apparatus comprising:
a computerized user interface;
a computerized data generator;
a computerized training component; a computerized profiler; and
a computerized verifier; wherein:
said user interface obtains a specification of a model property required to be upheld by a computerized machine learning system and obtains a specification of a data property generated from a sampling from a latent representation learned based on a training of a variational autoencoder for which the model property is to be upheld;
said data generator builds a training data set corresponding to said data property and inputs and outputs of said system;
said training component trains said system on said training data set;
said profiler monitors activity of said system before, during, and after said training, wherein said monitoring activity includes at least one of detecting a dead neuron, tracking changes in weights of a filter in a convolutional layer of said system, or tracking time and memory consumption of one or more neurons in said system; and
said verifier, based on said monitoring, evaluates performance of said system to determine whether said system, once trained on said training data set, upholds said model property for data that exhibit the data property generated from said sampling from said latent representation learned based on said training of said variational autoencoder, wherein, in said step of obtaining said specification of said model property, said model property is selected from the group consisting of: at least one value assertion; ability to overfit on original and derived data; noise resiliency; stability; invariability under affine transformation; invariability under non-linear transformation; invariability under augmentation; stability; sequentiality; order invariance; and resistance to adversarial examples.

22. The apparatus of claim 21, wherein said machine learning system comprises a computerized deep-learning-based network.

23. The apparatus of claim 22, wherein:
said data generator builds a test data set corresponding to said data property and inputs and outputs of said network; and
said verifier tests said network, once trained on said training data set, with said test data set, to further verify whether said network, once trained on said training data set, upholds said model property.

24. The apparatus of claim 21, wherein said obtaining of said specification of said data property comprises:
training said variational autoencoder on a plurality of samples;
learning said latent representation vector, based on said training;
sampling from said latent representation vector to generate a plurality of candidate properties; and
obtaining said specification of said data property from a user selection from a list of said plurality of candidate properties.

* * * * *